INVENTORS:
Chester H. Wickenberg
Moises B. Lorenzana
By George R. Clark
Atty

INVENTORS:
Chester H. Wickenberg
Moises B. Lorenzana
By George R. Clark
Atty

United States Patent Office 3,316,388
Patented Apr. 25, 1967

3,316,388
AUTOMATICALLY CONTROLLED IMMERSIBLE ELECTRIC COFFEE MAKER
Chester Wickenberg, Elgin, and Moises B. Lorenzana, Glen Ellyn, Ill., assignors to Sunbeam Corporation, Chicago, Ill., a corporation of Illinois
Original application June 14, 1961, Ser. No. 117,079, now Patent No. 3,224,360, dated Dec. 21, 1965. Divided and this application May 18, 1964, Ser. No. 368,159
7 Claims. (Cl. 219—442)

This application is a division of our copending application Serial No. 117,079, filed June 14, 1961, now U.S. Patent No. 3,224,360, and assigned to the same assignee as the present application.

The present invention relates to automatically controlled heating devices and, more specifically, to automatic cooking devices such as beverage brewers and coffee makers of the type in which the heating means is automatically controlled during the coffee making operation.

Beverage brewers and coffee makers of the so-called vacuum type such as disclosed in Jepson Patent No. 2,312,555 have been extensively used heretofore, and there are many people who believe that this type of coffee maker is superior to all other types. In general, this vacuum type of coffee maker comprises a lower heating chamber or vessel and an upper coffee infusion chamber or vessel. Conventionally, water is placed in the lower heating chamber while the coffee grounds are placed in the upper chamber. As the water is heated in the lower chamber, water vapor pressure is created above the liquid in this chamber which, when the temperature of the liquid approaches the boiling point of water, forces the water from the lower chamber into the upper chamber to infuse the coffee grounds contained therein. When the heat is removed from the lower chamber it cools so that the water vapor contained therein condenses to create a vacuum, thereby causing the hot water which has infused the coffee grounds, and now is really coffee, to be drawn back from the upper chamber through a suitable filter into the lower chamber where it is preferably maintained at a desired serving temperature which could be of the order of 160°, 180° or the like.

It will be understood that in automatic coffee makers of the type referred to above it is essential that the heat supply to the heating chamber be cut off when the water has substantially all been forced into the upper chamber. If this cutoff action occurs too soon, substantially all of the water will not have been forced to the upper chamber and the coffee will be diluted by the water remaining in the lower chamber when the coffee returns to the lower chamber. On the other hand, if the cutoff action is delayed for any appreciable period of time after all the water is forced out of the lower chamber or vessel, damage or destruction of the coffee maker may result. Actually, there have been on the market two types of automatic coffee makers embodying the so-called vacuum principle. In one type the chambers are made of metal and the heating element is built into the bottom of the lower metal chamber. An example of this type of coffee maker is disclosed and claimed in the above-mentioned Jepson Patent No. 2,312,555 assigned to the same assignee as the instant application. In this type of coffee maker it will readily be understood that when substantially all of the water has been forced from the lower chamber, a very rapid increase in the temperature of the bottom of the lower metal vessel will result and such rapid increase in the temperature of the lower vessel is utilized to actuate a thermostatically controlled switch for shutting off the heat at the proper time. The present invention is concerned with this type of coffee maker and, hence, it is unnecessary to discuss the problems of control of automatic vacuum type coffee makers where glass vessels are employed.

The automatic coffee maker of the above-mentioned Jepson patent has been a very successful device commercially and coffee makers of that type have been extensively sold throughout the world. The present invention is in the nature of an improvement on the coffee maker disclosed in the above-mentioned Jepson patent.

For proper operation of such vacuum type coffee makers it has been important to provide a good seal between the upper and lower vessels during the coffee making cycle and, as disclosed in the above-mentioned Jepson patent, a suitable tight fitting resilient sealing ring has been employed for this purpose. Although this arrangement has been very satisfactory, a problem is presented in the removal of the upper vessel upon completion of the coffee making operation. The housewife must break the tight fitting seal between the upper vessel and the lower vessel by applying a considerable amount of force to physically pull the vessels apart and when both vessels are hot, this is somewhat of a problem. It would be desirable to provide an arrangement where the vessels may be separated upon completion of the coffee making operation without the requirement of any force in breaking the seal and yet wherein a good seal is provided to maintain the vacuum type operation.

The modern trend in cleaning cooking devices has been to make it as simple as possible for the householder to clean such devices after use. It would be desirable to provide a vacuum type automatic coffee maker wherein both vessels may be completely immersed for washing without any deleterious effect on the automatic control incorporated therein.

Accordingly, it is an object of the present invention to provide a new and improved automatic coffee maker.

It is another object of the present invention to provide an improved seal between the two vessels of a vacuum type coffee maker.

It is a further object to provide a vacuum type coffee maker with improved, readily releasable locking means for locking the upper and lower vessels together.

Still another object of the present invention resides in the provision of improved control means for an automatic coffee maker of the vacuum type.

A further object of the present invention is to provide an improved automatic coffee maker which is completely immersible in liquid for cleaning purposes.

A still further object of the present invention resides in an improved automatic coffee maker which is simple and sturdy in construction, economical to manufacture and which is capable of giving long years of satisfactory and foolproof service.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which.

Briefly, the present invention is concerned with an automatic coffee maker of the vacuum type having upper and lower vessels, at least the lower one of which is formed of metal. A readily releasable O-ring seal is provided between the upper and lower vessels. This seal is provided with suitable locking means which are actuated by a pair of handles serving also as the means for handling the upper vessel or bowl. An improved temperature responsive switch of the snap acting type is provided which is simple and compact and which is manually actuated to the "On" position by means completely sealed with respect to the temperature responsive switch means. In other words, the entire control mechanism is completely sealed against the entrance of moisture so that the cooking vessel may be immersed for cleaning purposes.

Although the present invention is illustrated in the drawings as specifically applied to an automatic coffee maker of the vacuum type, it should be understood that certain features of the invention are applicable to other types of coffee makers as well as other cooking devices wherein a cooking operation may be controlled in the manner contemplated by the present invention.

Referring now to the drawings, there is illustrated an automatic coffee maker generally designated by the reference numeral 20 comprising a lower water heating chamber or vessel 21 and an upper coffee infusion chamber or vessel 22. Preferably these vessels are made of metal although at least the upper vessel 22 thereof might be made of glass, a suitable plastic or the like. The upper vessel 22 defining the coffee infusion chamber is provided with the conventional depending tube 23 which is adapted to be inserted into the lower vessel 21, as illustrated in FIGS. 1 to 4 of the drawings, to provide communication between the vessels 21 and 22. This tube 23 is preferably provided with a suitable small opening 24 (FIG. 4), such as is disclosed in the above-mentioned Jepson patent, to prevent movement of the water in vessel 21 into vessel 22 before this water is sufficiently heated.

Figure 1:
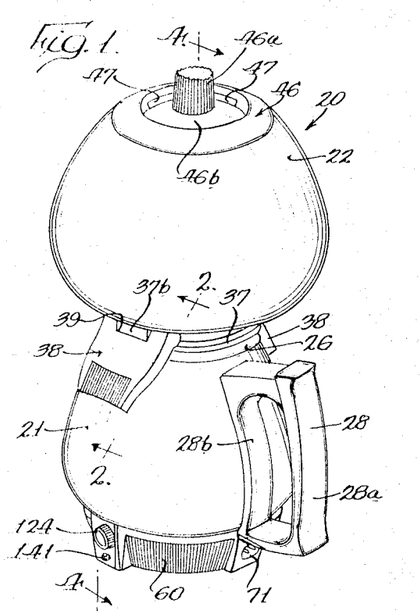
FIG. 1 is a perspective view of an automatic coffee maker of the vacuum type employed in the present invention wherein the upper and lower vessels are shown retained or locked in sealed relationship as would be the case during a coffee making operation.
Figure 6:
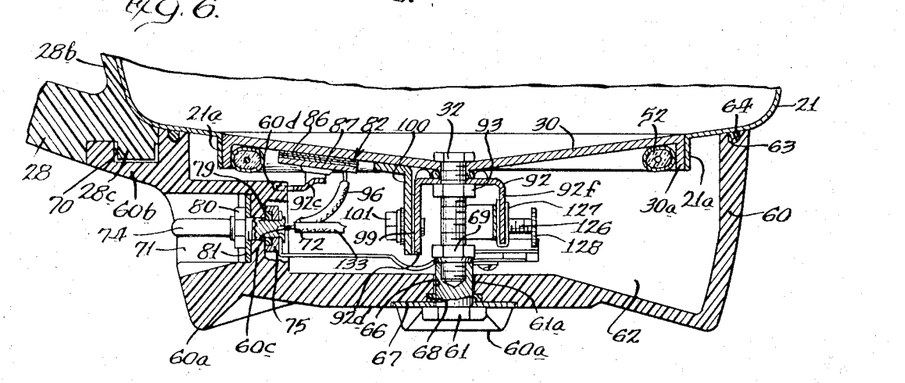
FIG. 6 is a sectional view taken on line 6—6 of FIG. 5, again assuming that FIG. 5 shows the complete structure.

As in the above-mentioned Jepson patent, the lower vessel 21 has an open top secured to which as by brazing or the like is a circular upright flange 26. In accordance with the present invention this upright flange is preferably provided with a circular inwardly directed annular recess or groove 27. So that the lower vessel may be used as a pouring vessel when the coffee making operation has been completed, the upright flange 26 preferably includes an extended portion, not shown, defining a pouring spout. Moreover, so that the lower vessel 21 may be readily handled by the operator when using it to pour coffee therefrom, a suitable handle 28 (FIGS. 1 and 6 of the drawings) is provided, the upper end of which is suitably secured to the vessel by fastening means well understood by those skilled in the art. This handle 28 preferably is of the form sometimes referred to as a "D handle" including portions 28a and 28b, the portion 28b conforming to the vessel wall, as best shown in FIGS. 1 and 6, with the lower end of the handle having projection 28c (FIG. 6) for interlocking relationship with another portion of the coffee maker 20 described hereinafter. The portion 28a is, of course, the hand grip portion. The handle 28 is preferably molded from a suitable phenolic resin or the like. In an embodiment built in accordance with the present invention, the interior of the vessel portion 21 is provided with suitable indicia stamped into the vessel wall indicating the number of cups of coffee for different levels in the vessel. So that this indicia is only visible on the interior of the vessel 21, it is preferably defined in the wall portion thereof beneath the portion 28b of the handle 28.

Figure 4:
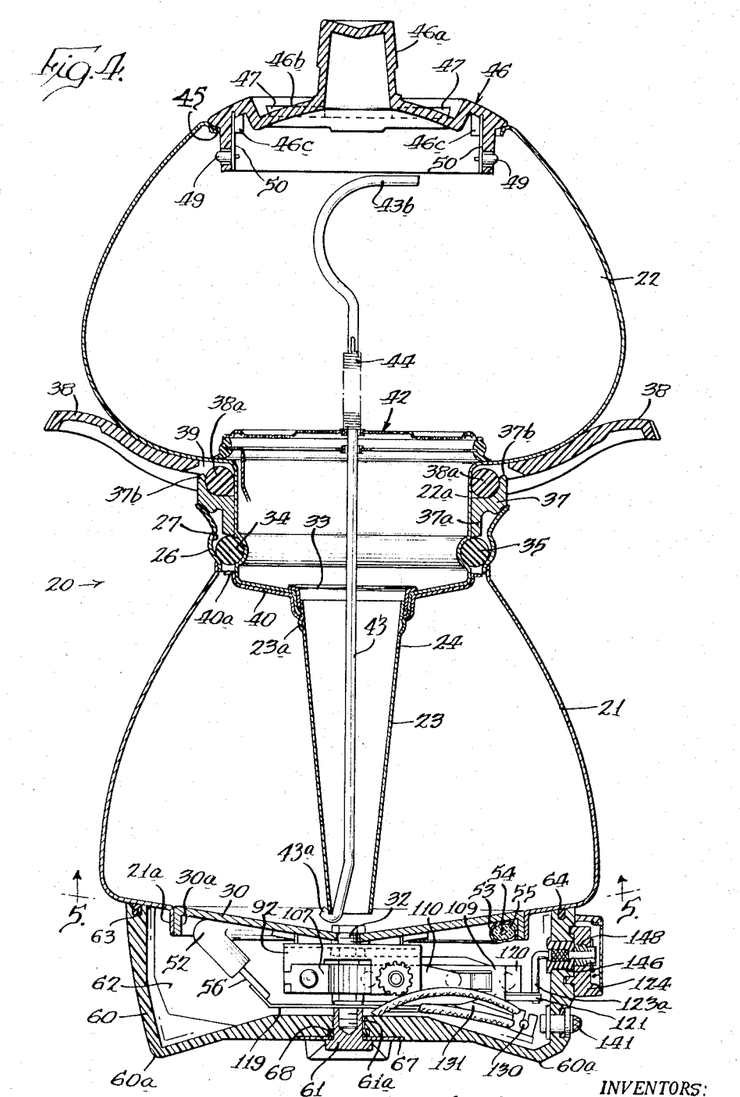
FIG. 4 is an enlarged sectional view taken on line 4—4 of FIG. 1, but showing the releasable locking arrangement in the condition of FIG. 3 and with the switch in the open position.
Figure 5:
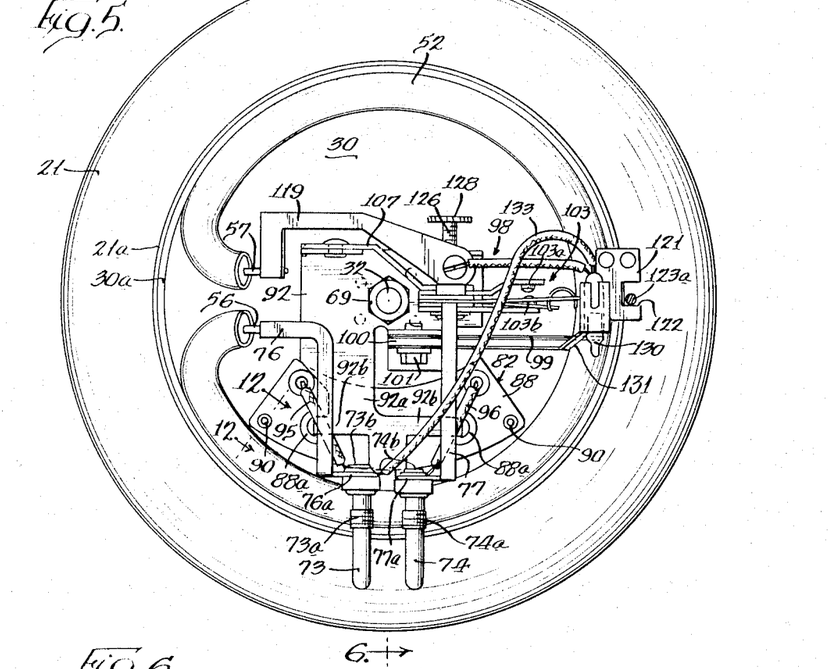
FIG. 5 is an enlarged sectional view taken on line 5—5 of FIG. 4, assuming that FIG. 4 shows the complete structure.

As is best shown in FIGS. 4, 5, and 6 of the drawings, the lower portion of the side wall of the vessel 21 terminates in an annular depending flange 21a of somewhat smaller diameter than the maximum diameter of the vessel 21, and the circular space within the annular depending flange 21a is closed by a bottom 30 of somewhat conical shape with the lowest level portion thereof at the center of the bottom. The bottom 30 is likewise provided with a depending peripheral flange 30a, the outer diameter of which is substantially the same as the inner diameter of the depending flange 21a. The depending flanges 21a and 30a are united in a liquid tight seal by means of a suitable brazing or similar operation so that effectively the bottom 30 is an integral part of vessel 21.

For the purpose of securing suitable temperature responsive control means and the like to the bottom of vessel 21, there preferably is provided a center stud 32 which extends through an opening defined in the bottom 30 and which is also suitably brazed or otherwise secured to the bottom 30 in a liquid tight manner.

Figure 2:
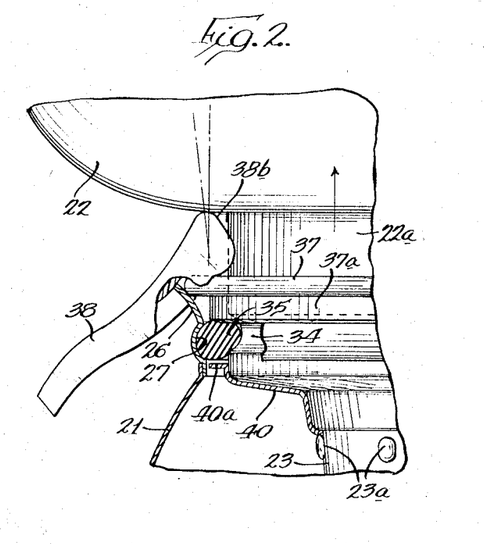
FIG. 2 is an enlarged fragmentary sectional view taken on line 2—2 of FIG. 1.
Figure 3:
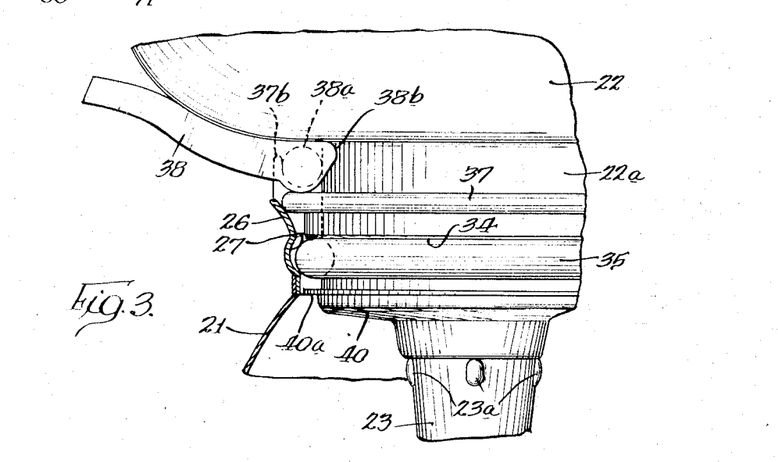
FIG. 3 is a fragmentary sectional view similar to FIG. 2, but showing the releasable locking means in the released position.

The upper vessel 22 with its depending tube 23 is preferably formed of metal and is shaped to provide a pleasing appearance such as is shown in FIGS. 1 and 4 of the drawings. Moreover, as illustrated in FIGS. 2, 3 and 4 of the drawings, the vessel 22 includes a cylindrical depending portion 22a having a diameter somewhat smaller than the diameter of the circular flange 26 secured to the lower vessel and a lower opening of a diameter to receive the upper end of tube 23, the latter being provided with protrusions 23a for positioning purposes. The tube 23 is suitably secured to the cylindrical portion 22a as by a ferrule portion 33, best shown in FIG. 4 of the drawings. In accordance with the present invention the cylindrical portion 22a is provided with an annularly outwardly directed recess 34 for receiving an O-ring 35 so that when the vessels 21 and 22 are assembled in operative relation for a coffee making operation, the O-ring 35 may be disposed in sealing relationship with respect to the annular grooves 27 and 34. The O-ring 35 is preferably formed of a silicone rubber and of a quality that will not affect the coffee from an odor or taste standpoint.

Figure 11:
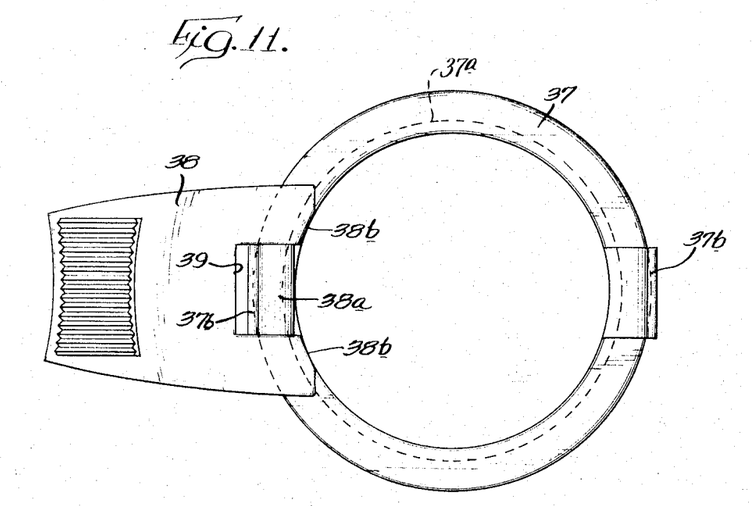
FIG. 11 is a top plan view of the seal ring and one of the upper handles associated therewith.

In order to lock the lower and upper vessels 21 and 22, respectively, in sealed relationship, as shown in FIGS. 1 and 2 of the drawings, there is provided a seal ring 37, best shown in FIGS. 2, 3, 4, and 11 of the drawings, in the form of a circular annular disk of somewhat L-shaped cross section having a depending annular flange 37a and a pair of diametrically opposed upwardly extending ears 37b. The seal ring 37 has an internal diameter such as to be slidably received on the cylindrical portion 22a of the vessel 22 and a pair of locking handles 38 are provided so as to be pivotally mounted on the ears 37b as best shown in FIGS. 4 and 11 of the drawings. The locking handles 38 are preferably formed of a molded phenolic material similar to the handle 28 and preferably of the same color and include a bifurcated end with an integral pivot pin 38a extending across the bifurcations so as to define an opening 39 between the pivot pin and the portion of the handle defining the bifurcated end. The ears 37b are receivable in the opening 39. The ends of the bifurcations designated at 38b effectively define a pair of camming surfaces which, when the handle members 38 are pivoted about the axis of the pivot pin 38a from the position of FIG. 3 to the position of FIG. 2, the camming portions 38b engage the underside of the vessel 22, as clearly shown in FIG. 2 of the drawings, and cam the sealing ring 37 downwardly in a manner tending to force the O-ring out of the groove 34 and, thus, insure a good seal between the flange 26 defining the opening in lower vessel 21 and the cylindrical depending portion 22a of upper vessel 22.

It will be understood that the locking members 38 are also handles for grasping the upper vessel 22 and, since they are formed on an insulating material, the upper vessel can be lifted and moved about even when it is hot as is the case immediately following a coffee making operation. Preferably the contour of the handles or locking members 38 is such as to conform closely to the bottom portion of the upper vessel 22, as clearly shown in FIGS. 3 and 4 of the drawings, thereby providing handles for firmly supporting the vessel.

It will be appreciated that the O-ring 35 disposed in recess 34 holds the seal ring 37 and consequently the handles 38 in assembled relationship. If the O-ring is removed from the groove 34 for cleaning purposes, the seal ring 37 and handles 38 become disassembled. In order that the seal ring 37 and handles 38 remain in assembled relationship even though the O-ring 34 is removed for cleaning purposes, a suitable retainer 40 may be provided which is suitably brazed or otherwise secured beneath the cylindrical extension 22a to provide a projecting annular flange 40a of larger diameter than the seal ring 37.

As is conventional with coffee makers of the vacuum type and as is specifically disclosed in the above-mentioned Jepson patent, the upper vessel 22 is provided with a suitable filter or strainer means generally designated at 42 (FIG. 4) disposed in the bottom of upper vessel 22 so as to retain the ground coffee which is placed therein and, thus, prevent the coffee grounds from entering the depending tube 23. The particular filter arrangement generally designated at 42 forms no part of the present invention but is disclosed and claimed in a copending application of Chester H. Wickenberg and Moises B. Lorenzana, Serial No. 120,740, filed June 29, 1961, now U.S. Patent No. 3,130,663, and assigned to the same assignee as the instant application. To hold the strainer means 42 in the position shown in FIG. 4 of the drawings, there preferably is provided a filter rod 43 and a coiled spring 44, the filter rod 43 having a hook portion 43a at the lower end for engaging the lower end of the depending tube 23. The coiled spring 44 then tends to bias the filter means 42 into sealing engagement with the bottom of vessel 22 above the cylindrical depending portion 22a. The upper end of the filter 43 is provided with a portion 43b which may be engaged by the operator in inserting and removing the filter as will readily be understood by those skilled in the art.

The upper vessel 22 is preferably provided with a top opening 45 of a diameter corresponding to the circular opening at the top of lower vessel 21 so that a common cover 46 may be employed. The cover 46 may be formed of a molded plastic with a suitable manually engageable knob portion 46a integrally formed therewith. Preferably, also, the cover 46 is provided with a depressed central annular portion 46b surrounding the knob 46a and suitable slots 47 are provided so that when the cover 46 is associated with the lower vessel 21, coffee may be poured through the slots in the cover 46. In order that the cover 46 may be removably latched to the lower vessel 21, it is provided with a pair of diametrically opposed latch buttons 49 which are pressed by suitable leaf springs 50 into a latching position as shown in FIG. 4 of the drawings. Preferably the latch buttons 49 are receivable within the groove 27 in lower vessel 21 to removably latch the cover into position. The latch spring 50 are preferably supported by suitable abutments 46c integrally formed with the cover 46 and effectively defining a groovelike recess for receiving the upper ends of these springs. Moreover, the latching buttons 49 which have projections extending through suitable openings in the lower ends of the leaf springs 50 prevent the leaf springs from moving out of engagement with the abutments 46c.

From the above description it will be apparent that an improved sealing arrangement has been provided between the lower vessel 21 and the upper vessel 22. This sealing arrangement is designed so that the cylindrical extension 22a with the O-ring 35 mounted thereon can readily be inserted in the circular opening in the lower vessel 21. Upon actuation of the locking levers 38 from the position shown in FIG. 3 to the position shown in FIG. 2, the O-ring 35 is expanded so as to make good sealing engagement between the nested portions of the vessels 21 and 22. When it is desired to remove the upper vessel 22 upon completion of a coffee making operation, the user need merely release the locking levers 38 moving them from the position shown in FIGS. 1 and 2 to the position shown in FIGS. 3 and 4, whereupon the upper vessel may be removed by merely lifting it upwardly with no force other than that to lift the weight of the upper vessel.

For the purpose of heating liquid contained in the lower vessel 21, there is provided a main heating element 52 which is in good heat exchange relationship with the underside of bottom 30 as best shown in FIGS. 4, 5 and 6 of the drawings. As illustrated, the heating element 52 is preferably of the well-known sheathed form comprising an outer metal sheath 53 within which is disposed a resistance element 54 preferably disposed in the form of a spiral coil and spaced and supported within the sheath 53 by suitable electrical insulating material 55 which also provides a good heat conductor. The heating element 52 is arranged in a circular configuration as best shown in FIG. 5 of the drawings and disposed closely adjacent the depending flange 30a of the bottom 30. The ends of the resistance element 54 of sheathed heating element 52 are connected to terminals 56 and 57 extending out of the sheath 53, and these terminals are illustrated as being closely adjacent to each other and extend into a different plane from the main portion of the heating element 52. Only a single turn of the sheathed heating element 52 is necessary since the bottom 30 is preferably formed of a material having a very high heat conductivity, such as sheet copper or the like. Moreover, the heating element 52 is brazed to the bottom 30 so as effectively to comprise an integral part of such bottom.

Preferably and as disclosed in the above-mentioned Jepson patent, the automatic coffee maker 20 is provided with an insulating base 60 formed of a suitable phenolic material or the like which is adapted to be secured to the bottom of vessel 21 by the center stud 32 and specifically by means of a nut 61 engageable with the threaded end of the stud 32. The base 60 effectively defines a control chamber 62 therein beneath the lower vessel 21. Essentially the base 60 is a saucer shaped member having a circular rim portion with an annular peripheral recess 63 defined therein for receiving a sealing gasket 64 for providing a moisture tight seal between the rim of the base 60 and the bottom of vessel 21 engaged thereby as clearly shown in FIG. 6 of the drawings. The sealing gasket 64 normally has the cross sectional configuration, best shown in FIG. 7 of the drawings, when not stressed by being clamped against the bottom of vessel portion 21. An important aspect of the present invention, as was mentioned above, resides in a completely sealed arrangement whereby the lower vessel 21 may be immersed in liquid for cleaning purposes. The gasket 64 thus insures that no liquid can enter the chamber 62 at the junction between the base 60 and the vessel 21. It will be appreciated that the center stud nut 61 engaging the center stud 32 applies the necessary compressive force to the gasket 64.

As illustrated in FIG. 6 of the drawings, the base 60 is provided with a central opening 66 and the bottom of the base concentric with the opening is provided with a first counter sunk portion for receiving a spring washer 67 and a slightly deeper counter sunk portion for receiving an O-ring 68, the latter being necessary to seal the central opening 66 against the entrance of moisture. The center stud nut 61 is illustrated as having a shank portion 61a extending into the opening 66 for threadedly engaging the stud 32, and when the stud nut 61 is in the position indicated at FIG. 6 of the drawings clamped against a stop nut 69, a seal is provided not only at the top periphery of the base 60 but also at the opening 66. It will be understood that spring washer 67 in effect provides spring loading means for maintaining a predetermined pressure on the sealing means 64 and 68. In order that the portion of the center stud nut 61 projecting below the base 60 does not interfere with supporting the coffee maker 20 from a suitable surface, the base 60 is preferably provided with a plurality of lug portions 60a at uniformly spaced positions at the periphery thereof effectively defining legs.

So that the lower end of the handle 28 may be secured to the coffee maker 20, the base 60 is provided with an extension 60b (FIG. 6) adjacent the top periphery thereof, which extension is provided with a recess 70 for receiving in interlocking relationship the lug 28c. Thus, the center stud nut 68 not only provides the two seals described above but also securely locks the lower portion of handle 28 to the vessel 21 and base 60.

Figure 8:
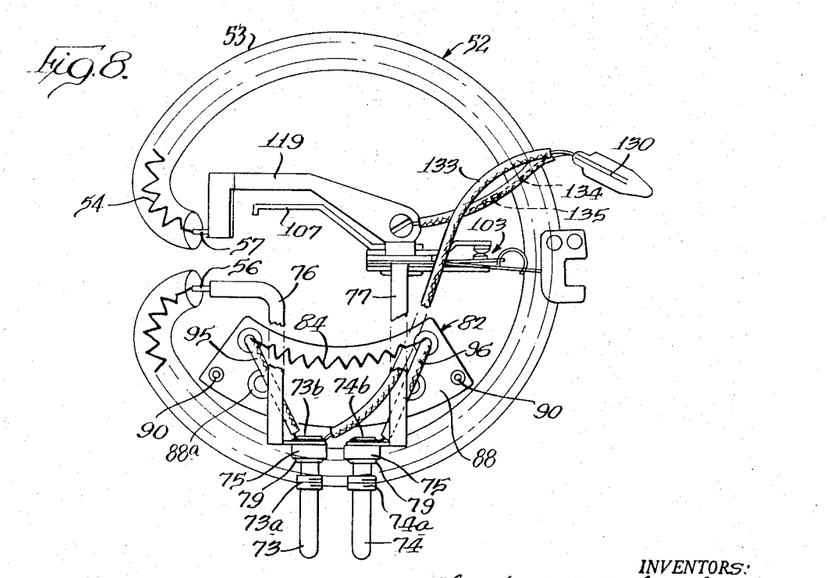
FIG. 8 is a somewhat schematic diagram illustrating the electrical circuit of the automatic coffee maker of the present invention with the control switch in the close position.

It is common practice with electrical appliances today to connect them to a source of electrical power through a power cord generally comprising a female type connector adapted to make electrical connection with a male type bayonet or so-called pin contacts. To this end the base 60 is provided with an outwardly opening recess 71 disposed immediately beneath handle 28 and having wall portions integrally molded with the base 60. The inner wall of recess 71, designated by the reference numeral 60c, is provided wtih a pair of spaced openings 72 one of which is shown in FIG. 6 of the drawings. These openings are adapted to receive in sealed relationship therewith a pair of contact pins 73 and 74. The terminal or contact pins 73 and 74 include a threaded portion 73a and 74a, respectively, at an intermediate point therealong. Each of the contact pins 73 and 74 has the end thereof remote from the portions projecting into the recess 71 of tubular form extending through an O-ring supporting member identical for each terminal pin and designated by the reference numeral 75. Moreover the tubular portion of terminal pins 73 and 74 extending through the O-ring supporting portion 75 are peened over or riveted as indicated at 73b and 74b, respectively, to secure thereto not only the O-ring supporting members 75 but also suitable terminal connections as illustrated in FIG. 8 of the drawings. The contact pin 73 is riveted as indicated at 73b to electrically secure thereto a terminal portion 76a of a rigid conductor element 76, the other end of which is directly connected to terminal 56 of sheathed heating element 52. In a similar manner the corresponding end of contact pin 74 is riveted as indicated at 74b electrically to secure thereto a terminal portion 77a of rigid lead or conductor 77 which makes electrical connection with suitable switch means described hereinafter.

In order to seal the openings such as 72 in wall portion 60c, each of the O-ring supporting portions 75 is provided with an annular recess for receiving an O-ring 79 (FIGS. 6 and 8). The contact pins 73 and 74 are inserted through the openings 72 and suitable nuts 80 are then applied to the threaded portions 73a, respectively, whereby the rigid terminals 73 and 74 are supported in spaced parallel relationship by the wall portion 60c, and the O-rings 79 insure that these openings 72 are sealed against the entrance of moisture. Preferably platelike washers 81 are provided between the nuts 80 and wall 60c. These platelike washers may be formed of stainless steel since they are exposed in the recess 71.

Figure 12:
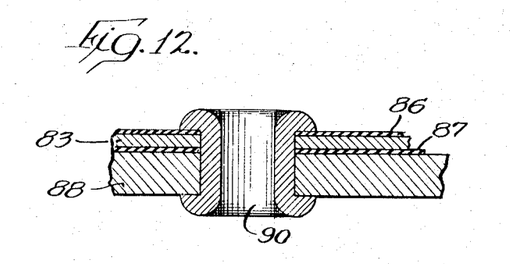
FIG. 12 is a greatly enlarged fragmentary sectional view taken on line 12—12 of FIG. 5.

In accordance with the present invention the main heating element 52 is utilized only during the coffee brewing operation to heat the bottom 30 of the lower vessel 21 to a temperature in excess of 200 F. until all the water in the lower vessel is forced into the upper vessel 22. When heating by the main heating element 52 is terminated, for the purpose of keeping the brewed coffee in the lower vessel 21 at a desirable serving temperature of 160° to 180° F., there is provided a secondary heating element generally designated at 82 and best shown in FIGS. 5, 6, 8, and 12 of the drawings. This auxiliary heating element comprises an insulating core 83 (FIG. 12) of the shape of an annular segment preferably formed of mica or the like about which is wound a resistance wire schematically indicated in FIG. 8 of the drawings by the reference numeral 84. If desired, the edges of the mica core 83 may be serrated to receive the turns of the resistance wire 84. In a device built in accordance with the present invention the resistance of the secondary heating element 82 was such as to consume 40 watts of electrical energy and supply this as heat. In order to insulate the resistance wire 84 secured on core 83, there are provided, as best shown in FIG. 12, top and bottom heater insulators 86 and 87 preferably, also, formed of mica or the like and of the same shape as core 83. A rigid backing plate 88 also of the shape of elements 83, 86 and 87 is provided below the bottom insulator 87 and suitable hollow rivets 90 hold the elements 83, 84, 86, 87 and 88 in assembled relationship as clearly indicated in FIG. 12 of the drawings.

The assembled secondary heater 82 is held against the bottom 30 of the vessel 21 in good heat exchange relationship, as clearly indicated in FIGS. 5 and 6 of the drawings, with the top insulator 86 in contact with the vessel bottom 30. For the purpose of holding this heater in engagement with the vessel bottom 30, there is provided a combined switch mounting bracket and secondary heater clamping plate generally designated as 92. This plate 92 has an opening 91 for receiving the stud 32 and is clamped into position by a nut 93 threadedly engaging the stud 32. To perform this clamping function, combined switch mounting bracket and secondary heater clamping plate 92 is provided with an extension 92a including a pair of lateral projections 92b each terminating in end projections receivable in openings defined in raised protuberances 88a on backing plate 88, thus holding secondary heater 82 in intimate heat exchange relationship with the bottom 30 of vessel 21. Plate 92 also includes a forked projection 92c for receiving a weblike projection 60d from the wall 60c of base 60 thereby preventing the base 60 from rotating about the axis of stud 32.

The secondary heater 82 is provided with suitable terminals which are electrically connected by insulated conductors 95 and 96 with the contact pins 73 and 74, respectively. Thus, whenever electrical power is connected to the contact pins 73 and 74, the secondary heater 82 is energized.

As was mentioned above, it is desirable to terminate heating of the lower vessel 21 by the main heating element 52 when a substantial increase in temperature of the bottom 30 occurs, due to all of the water having been forced from the lower vessel 21 into the upper vessel 22. To this end there is provided a temperature responsive control means generally designated by the reference numeral 98 which includes as an important part thereof a bimetallic element 99 having one end fixed to a heat lug 100 (FIGS. 4, 5, 6 and 9). The heat lug 100 is indicated as an L-shaped member of good heat conducting material having one leg thereof brazed to the bottom 30 of vessel 21. Preferably one end of the bimetallic element 99 is clamped between the heat lug 100 and a depending projection 92d of plate 92, which projection is in spaced parallel relationship with one arm of the heat lug 100. Suitable fastening means 101 secures the end of bimetallic element to the heat lug 100 and projection 92d. The free end of bimetallic element 99 is provided with an insulating switch actuating member 102 (FIG. 9) and upon heating of the vessel 21, the free end of bimetallic element 99 tends to deflect upwardly as viewed in FIG. 9 of the drawings.

Figure 9:
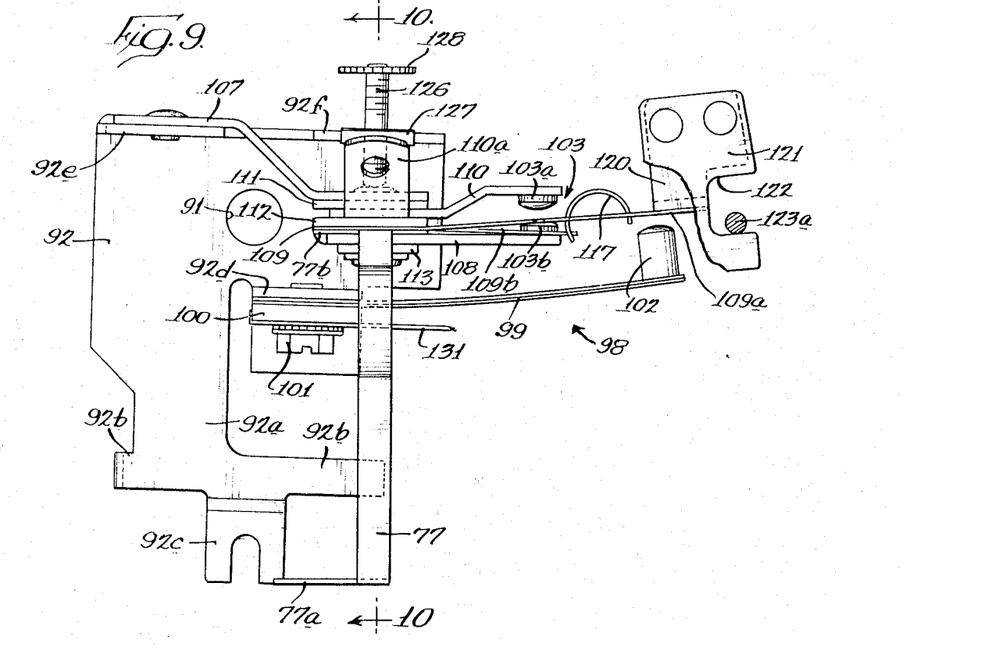
FIG. 9 is an enlarged view of a portion of the switch means of FIG. 5 more fully to illustrate the switch assembly and shows the bimetallic element in the heated and deflected conditions.
Figure 10:
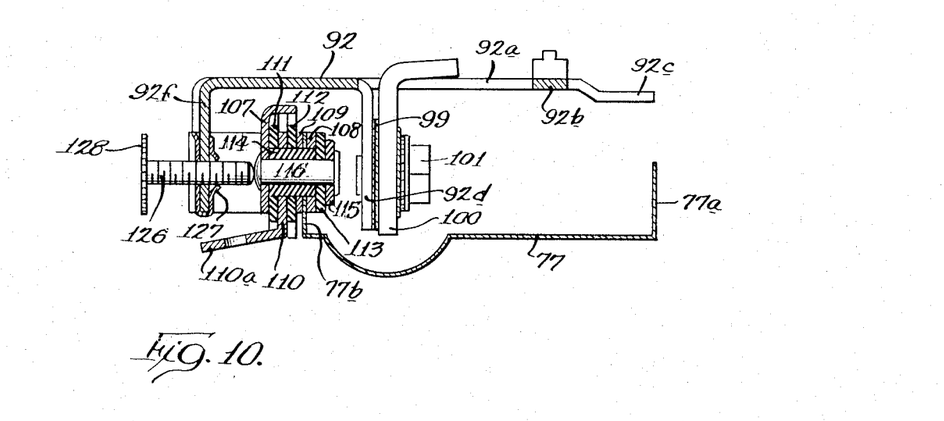
FIG. 10 is a sectional view taken on line 10—10 of FIG. 9.

The temperature responsive device 98 further includes a snap acting switch 103 comprising relatively movable contacts 103a and 103b, as best shown in FIGS. 9 and 10 of the drawings. The snap acting switch 103 includes operating means supported on a switch mounting arm 107 having one end thereof secured to downwardly extending projections 92e of combined switch mounting plate and secondary heater clamp 92. The switch mechanism comprising the switch and operating means includes a stack of conducting and insulating members which are clamped to the free end of switch mounting arm 107 as illustrated in FIGS. 9 and 10 of the drawings. This stack of elements comprises a contact spring stop 108 formed of rigid material, a terminal portion 77b of terminal lead 77, movable contact supporting spring 109, a stationary contact supporting arm 110 having a terminal lug 110a, sheet insulators 111, 112 and 113, sleeve insulator 114, washer 115, and finally a rivet 116 which holds all these elements in assembled relationship as clearly indicated in FIG. 10 of the drawings. The contact spring 109 comprises the well-known type of movable contact supporting element having a flexible rectangular outer frame member 109a and an integral central finger 109b supporting the movable contact 103b. A suitable C-shaped toggle spring 117 has one end connected to the finger 109b and the other end connected to the frame 109a. Deflection of the free end of the frame 109a in either of two directions will then cause the movable contact 103b to move with a snap action from the open position shown in FIG. 9 of the drawings where the finger 109b is against contact spring stop 108 to the closed position where the contact 103b engages the stationary contact 103a or vice versa. The frame 109a has a portion thereof in the path of insulating switch actuating member 102 on the free end of bimetallic element 99 so that upon deflection of bimetallic element 99 with heating, the switch 103 is opened.

To complete the electrical circuit for the main heating element 52 through the switch 103, there is provided, as best shown in FIGS. 5 and 8 of the drawings, bus bar 119 of relatively rigid conducting material connected between terminal lug 110a of stationary contact supporting arm 110 and the terminal 57 of the main heating element 52. Since the conductor 77 electrically connects the contact spring 109 and, hence, movable contact 103b with the contact pin 74, it will be obvious from FIG. 8 that when the switch 103 is closed, as indicated in FIG. 8 of the drawings, the main heating element 52 will be energized. When bimetallic element 99 is deflected by heating to the position of FIG. 9 of the drawings, it will cause opening of the switch 103.

So that the switch 103 may be manually closed when desired, there is secured to the free end of contact spring 109 a bracket 120 supporting a fork insulator 121. The fork insulator 121 has a notch or recess 122 therein for receiving a switch closing extension 123a of a member 123 operatively related to switch control knob 124 described hereinafter and best shown in FIGS. 4 and 7 of the drawings.

For the purpose of providing an initial adjustment for the temperature at which the main heating element is rendered ineffective, there is provided an adjustment screw 126 which is threaded into a speed nut 127 mounted on another depending projection 92f of the plate 92. A suitable control wheel 128 permits manual rotation of the adjustment screw 126. The free end of the adjusting screw 126 is adapted to engage the switch mounting arm 107 or the end of the rivet 116 so that the entire stack of elements comprising the switch mechanism may be moved toward and away from the bimetallic element 99. By rotating the adjusting screw 126 in one direction the switch mounting arm 107 is deflected toward the bimetallic element 99. Upon rotation of the adjusting screw 126 in the other direction it permits the inherent resilience of the switch mounting arm 107 to move the switch assembly away from the bimetallic element 99. Preferably the base 60 is originally molded with a small opening, not shown, disposed beneath the wheel 128 so that when the coffee maker has been assembled, suitable tests can be run on the device and the wheel 128 adjusted by a suitable tool inserted through such opening in the base 60. When the proper adjustment is obtained, then this opening may be sealed by a suitable plastic or similar sealing plug.

It is generally desirable to know when the brewing operation has been completed and to this end there is preferably provided a suitable indicating light designated at 130 supported by a lamp bracket 131, which bracket may be clamped by the fastening means 101 to the heat lug 100. The lamp 130 is preferably a neon bulb and is connected across the terminals of the main heating element 52 by means of a conductor 133 and a conductor 134 and series current limiting resistor 135. Preferably these conductors and the resistor are contained within suitable insulating sleeves as best shown in FIG. 8 of the drawings. With this arrangement the neon light 130 will be energized during the brewing operation when the main heating element 52 is energized and when the switch 103 is opened, the light 130 will be deenergized.

Figure 7:
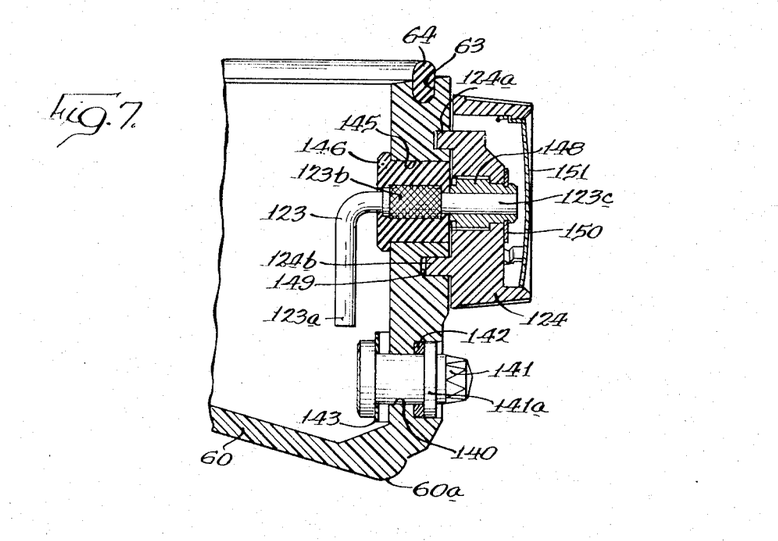
FIG. 7 is an enlarged fragmenttary view of a portion of FIG. 4.

So that this light may be visible outside chamber 62, the base 60, as best shown in FIGS. 4 and 7 of the drawings, is provided with an opening 140 for receiving a suitable lens 141. Preferably this lens is provided with an enlarged annular flange 141a receivable within a counter sunk portion surrounding the outer edge of opening 140 and a sealing gasket or O-ring 142 is provided to seal the opening 140 against the entrance of moisture. A suitable clamping element 143 engaging the inner wall of base 60 and engaging lens 141 holds the latter in position and, furthermore, clamps the O-ring 142 into sealing engagement between the flange 141a and the base 60.

It will be appreciated that the knob 124 must be outside the chamber 62, whereas the switch actuating member 123a is disposed within such chamber. So that this can be accomplished while maintaining the chamber 62 sealed against the entrance of moisture, the member 123 which is a pivotal member is provided with a knurled portion 123b disposed within an opening 145 in wall means defining the base 60. A suitable rubber or plastic resilient annular plug member or resilient diaphragm 146 is preferably vulcanized or otherwise secured to the walls defining the opening 145 and to knurled portion 123b. The inherent resilience of the member 146 is such that limited movement of member 123 sufficient to actuate the switch 103 to the closed position can take place. The member 123 includes a portion 123c extending outside of chamber 62 and suitably secured to portion 123c is a knurled sleeve 148 cooperating with the knob 124. The base 60 surrounding the opening 145 is preferably provided with an annular recess 149 for receiving an annular projection 124a and a plurality of spaced lugs 124b extending from beyond such annular projections. The lugs 124b serve as stops engageable with cooperating members in the annular groove 149 to limit the maximum pivotal movement of the knob 124. Preferably a suitable clamping member 150 engageable with a groove in the member 148 holds the knob in assembled position and, if desired, a decorative plate 151 may be secured to the front of the knob to hide the end of member 148, the member 150 and the member 123. The portion 123a of member 123 is receivable within the notch 122 of the fork insulator 121, so that upon rotation of the knob 124, the fork insulator and associated contact spring may be moved to the position shown in FIG. 8 of the drawings. The portion 123a of the member 123 does not interfere in any way with snap acting movement to the switch open position of the contact spring 109.

From the above description it will be appreciated that there has been provided a simple automatic coffee maker 20 which is inexpensive to manufacture and which is foolproof in operation. Furthermore, by the improved seal between the vessels, proper operation is assured and the housewife can separate the vessels at the end of the brewing period without any problem whatsoever. When the coffee making operation is completed, the main heating element is turned off and the secondary heating element keeps the coffee in the lower vessel at a desirable serving temperature. The control switch is only actuated twice during a coffee making operation, once when the switch is closed by manual actuation of the knob 124 and finally at the termination of the brewing operation when the bimetallic element moves the contact spring 109 sufficiently to cause it to open the contacts with a snap action. Furthermore, the lower vessel 21 as well as the upper vessel 22 may be completely immersed in liquid for cleaning purposes without any possible damage to any of the electrical circuits.

While there has been shown and described a particular embodiment of the present invention, it will be understood that various changes and modifications of the invention will occur to those skilled in the art. It is aimed in the appended claims to cover all such changes and modifications as fall within the true spirit and scope of the invention.

What is claimed as new and desired to be secured by Letters Patent of the United States is:

1. An automatically controlled electric coffee maker completely immersible in liquid for cleaning purposes comprising, a water heating vessel, an electric heating element secured in intimate heat exchange relationship with the bottom of said vessel, temperature responsive control means including an electric circuit connected to control said heating element, wall means defining a sealed housing secured to said vessel and enclosing said heating element and temperature responsive control means, means defining an opening in said wall means, a manual operating means for said temperature responsive control means including a pivotal member extending through said opening and movable from a first position to a second position and operatively associated with at least a part of said control means, and a resilient plug secured in said opening and bonded to said pivotal member for sealing said opening surrounding said pivotal member, said plug urging said pivotal member to said first position.

2. The coffee maker of claim 1 wherein said temperature responsive control means includes a snap acting switch and a bimetallic element for actuating said switch to the open position upon predetermined heating of said vessel, said pivotal member including means for operating said switch to the closed position.

3. The coffee maker of claim 1 wherein said wall means includes an insulating cup-shaped base having a circular upper edge engageable with the bottom of said vessel, a stud depending from the center bottom of said vessel, means including said stud for clamping said base to the bottom of said vessel, sealing means clamped between said circular upper edge and said vessel, and spring loading means for maintaining a predetermined pressure on said sealing means.

4. The coffee maker of claim 1 additionally comprising a handle for said vessel, said wall means including a cup-shaped base having an upper edge engageable with the bottom of said vessel, means including a stud projecting from the center bottom of said vessel for clamping said base to the bottom of said vessel, and means for securing said handle to said base including interlocking portions, one on said handle and one on said base.

5. In an automatically controlled electric heating device the combination of a vessel, a main electric heating element in intimate heat exchange relationship with the bottom of said vessel, a stud depending from the center bottom of said vessel, electric terminals associated with said vessel, temperature responsive control means in circuit with said main heating element and said terminals for controlling the energization of said main heating element and including a switch, a secondary electric heating element in heat exchange relationship with said vessel and directly connected to said terminals whereby said secondary heating element is independent of said temperature responsive control means, an insulating cup-shaped base having a circular upper edge engageable with the bottom of said vessel to define a chamber for housing said control means, means including said stud for clamping said base and said second heating element to the bottom of said vessel and for supporting said control means within said chamber, means for manually operating said switch from its open to its closed position including a pivotal member extending through said base, a resilient sealing member sealing the area where said pivotal member passes through said base, means defining an aperture in the bottom of said base for said stud, said stud extending through said aperture, sealing means clamped between said circular upper edge of said base and said vessel, spring loading means acting between said stud and said base for maintaining a predetermined pressure on said sealing means, and means for sealing said aperture and said terminals.

6. The heating device of claim 5 additionally comprising a handle secured to said vessel, and means for securing said handle to said base including interlocking portions, one on said handle and one on said base.

7. The heating device of claim 6 wherein said handle includes a portion conforming to the side of said vessel, and indicia means defined in said vessel side visible both from the interior and exterior of said vessel, said portion of said handle overlying the indicia means visible from the exterior of said vessel.

References Cited by the Examiner

UNITED STATES PATENTS

| | | | |
|---|---|---|---|
| 2,522,718 | 9/1950 | Huck. | |
| 2,522,420 | 5/1951 | Frankel | 219—441 |
| 2,692,937 | 10/1954 | Clark | 219—436 |
| 2,817,743 | 12/1957 | Foster | 219—436 |
| 2,856,844 | 10/1958 | Price | 219—292 X |
| 2,860,229 | 11/1958 | Ziegler | 219—442 |
| 2,866,401 | 12/1958 | Sidell | 99—312 |
| 2,896,062 | 7/1959 | Kueser | 219—441 |
| 3,022,411 | 2/1962 | Soper et al. | 219—441 |
| 3,059,092 | 10/1962 | Olson | 219—441 |
| 3,135,189 | 6/1964 | Jepson et al. | 219—441 X |

FOREIGN PATENTS

| | | |
|---|---|---|
| 907,269 | 6/1945 | France. |
| 193,595 | 12/1907 | Germany. |

ANTHONY BARTIS, *Primary Examiner.*